United States Patent
Bai et al.

[11] Patent Number: 5,604,660
[45] Date of Patent: Feb. 18, 1997

[54] ELECTROCHEMICAL CELL HAVING SOLID POLYMER ELECTROLYTE AND ASYMMETRIC INORGANIC ELECTRODES

[75] Inventors: Lijun Bai, Vernon Hills; John E. Nerz, Hawthorn Woods; Changming Li, Vernon Hills, all of Ill.

[73] Assignee: Motorola, Inc., Schaumburg, Ill.

[21] Appl. No.: 588,219

[22] Filed: Jan. 18, 1996

Related U.S. Application Data

[63] Continuation of Ser. No. 513,648, Aug. 10, 1995, Pat. No. 5,518,838.

[51] Int. Cl.$^6$ ............................................ H01G 9/02
[52] U.S. Cl. ...................... 361/525; 361/523; 361/528; 361/532
[58] Field of Search .................................. 361/500, 502, 361/523, 524, 525, 526, 527, 528, 532; 429/190, 191, 192, 194, 203, 204, 205, 206, 207

[56] References Cited

U.S. PATENT DOCUMENTS

| | | | |
|---|---|---|---|
| 4,500,667 | 2/1985 | Polak et al. | 524/406 |
| 4,705,545 | 11/1987 | Polak et al. | 55/158 |
| 4,824,528 | 4/1989 | Polak et al. | 204/1 T |
| 4,942,501 | 7/1990 | MacFarlane et al. | 361/523 |
| 5,510,046 | 4/1996 | Li et al. | 429/190 |
| 5,518,838 | 5/1996 | Bai et al. | 429/191 |
| 5,538,813 | 7/1996 | Li | 361/525 |
| 5,552,245 | 9/1996 | Li et al. | 429/207 |

*Primary Examiner*—Bruce F. Bell
*Attorney, Agent, or Firm*—Kenneth M. Massaroni

[57] ABSTRACT

An electrochemical cell is made with two asymmetric electrodes and a solid polymer electrolyte. The anode is made from materials such metal hydrides, metals, metal hydroxides or metal oxides. The cathode is made from metal hydrides, metals, metal hydroxides or metal oxides. A solid polymer electrolyte is in intimate contact with and situated between the anode and the cathode. The solid polymer electrolyte is made from a polymeric binder such as polyethylene oxide, polyvinylalcohol, polyvinyl acetate, polyacrylamide, poly(vinylpyrrolidone), poly(2-vinylpyridine), poly(4-vinylpyridine) and polyethyleneimine. The polymeric binder has $H_2SO_4$ or $H_3PO_4$ dispersed within it.

4 Claims, 9 Drawing Sheets

ELECTROCHEMICAL CELL HAVING SOLID POLYMER ELECTROLYTE AND ASYMMETRIC INORGANIC ELECTRODES

This is a continuation application under §1.60 of U.S. patent application Ser. No. 08/513,648 filed Aug. 10, 1995, now U.S. Pat. No. 5,518,838, and assigned to Motorola, Inc.

TECHNICAL FIELD

This invention relates in general to electrochemical cells, and more particularly to cells having solid polymer electrolytes.

BACKGROUND

Energy generation and storage has long been a subject of study and development. Of special importance is the storage of electrical energy in a compact form that can be easily charged and discharged, such as rechargeable batteries and/or electrochemical capacitors. High power, especially high current pulse, rechargeable electrochemical storage devices are very important in applications using electrical pulses such as communications and power tools. In these devices, high electrochemical kinetic rate, long cycle life of the electrode, and good ionic conductivity of the electrolyte are extremely important.

Most high-power electrochemical energy storage devices utilize aqueous electrolytes, since the aqueous electrolytes are known to have the highest ionic conductivity. However aqueous electrolytes also result in problems when handling and packaging the devices. Furthermore, some good high-power electrochemical energy storage devices such as nickel/zinc (Ni-Zn), and silver/zinc (Ag-Zn) batteries do not have good cycle life due to dendrite growth on the zinc anode. The growth of dendrites on the zinc anode causes short circuits that significantly reduce the cycle life of the battery and is a severe limitation of the conventional art.

Since a zinc anode can provide a very negative anodic potential compared to other materials, it would be highly desirable to provide an electrochemical energy storage device utilizing zinc anodes that did not suffer from the poor cycle life due to dendritic growth. Elimination of this phenomena would enable one to create a device having increased charged storage capacity, thus further enabling the miniaturization of energy storage devices.

DETAILED DESCRIPTION OF THE PREFERRED EMBODIMENT

A new type of electrochemical cell that has a solid polymer electrolyte and asymmetric inorganic electrodes has been developed. When combined with the proper electrode systems, the polymer electrolyte may be used to produce energy storage devices with very high power density. Furthermore, due to the unique properties of the polymer electrolyte, the electrode cycle life and power density has been significantly increased.

Figure 1:
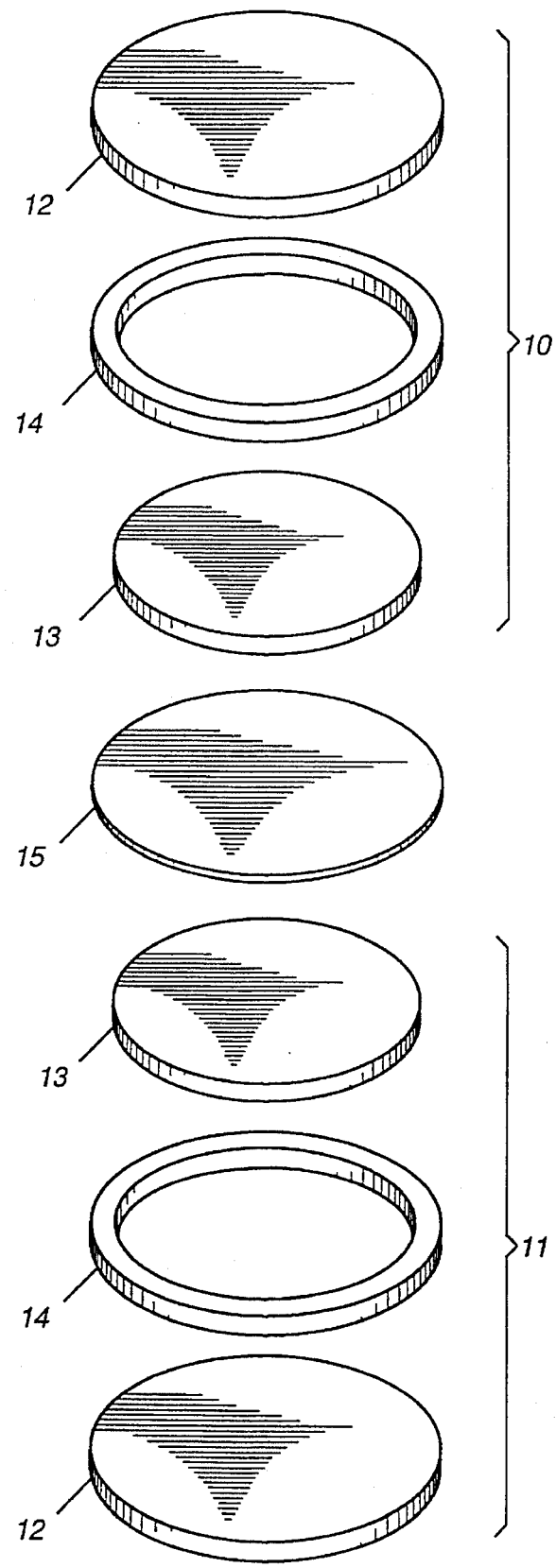
FIG. 1 is an exploded view of an electrochemical energy storage device in accordance with the invention.

While the specification concludes with claims defining the features of the invention that are regarded as novel, it is believed that the invention will be better understood from a consideration of the following description in conjunction with the drawing figures, in which like reference numerals are carried forward. Referring now to FIG. 1, an energy storage device, such as an electrochemical cell, is made from a pair of asymmetric electrode assemblies 10 and 11. As used herein, the term 'asymmetric electrodes' means that the two electrodes are not the same composition, i.e. they are made from different materials. Examples of some asymmetric electrodes are anodes made from metal hydrides (MH) or metals such as Al, Bi, Fe, In, Mg, Mn, Pb, Sb, Sn, W, Zn and oxides, hydroxides or alloys thereof. Cathodes may be made from Ag, Au, Co, Cr, Cu, Fe, Mn, Mo, Ni, Pb, V, W and oxides, hydroxides or alloys thereof. These materials are simply presented by way of example and are not intended to limit the scope of the claims. The term "electrochemical cell" includes, but is not limited to, a battery, an electrochemical capacitor (a redox capacitor) or a BATCAP™ (a hybrid device which exhibits the characteristics of a battery and a capacitor). Each electrode assembly may include a current collector 12 which is electrically conducting. The current collector 12 is preferably chemically inert to the electrolyte 15. A housing or gasket 14 may be employed to house the electrodes and the electrolyte, but is optional. The electrolyte 15 that is sandwiched between the electrodes is in the form of a film and also serves as a separator between the two electrodes 10 and 11, thereby affording free and unobstructed movement to the ions in the electrolyte. The combination electrolyte/separator prevents contact between the opposing electrodes 13, since such a condition would result in a short circuit and malfunction of the cell. The electrolyte may also be used in conjunction with a conventional separator, and in that embodiment it is impregnated into a porous separator. Materials useful for a porous separator are well known to those skilled in the art, including porous versions of polymers such as polyvinylchloride, polypropylene, and cellulose acetate, filter paper, felt, and other types of similar materials. The separator is typically saturated with the electrolyte while the electrolyte is still in the liquid form.

In the preferred embodiment of the invention, a polymer electrolyte is made from a polyvinyl resin and phosphoric acid. Polyvinyl resins are those polymeric materials generally considered to include polymers derived from monomers having the structure

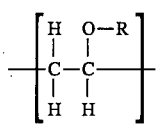

in which R represents hydrogen, alkyl, halogen or other groups. Many of the monomers can be prepared by addition of the appropriate compound to acetylene. The properties vary with chemical structure, crystallinity, and molecular weight. For example, polyvinyl alcohol (PVA) is a tough, whitish polymer which can be formed into strong films, tubes and fibers that are highly resistant to hydrocarbon solvents. Although PVA is one of the few water soluble polymers, it can be rendered insoluble in water by the use of crosslinking agents. Two groups of products are available, those formed by the essentially complete hydrolysis of polyvinyl acetate, and those formed by incomplete hydrolysis. The former may be plasticized with water or glycols and molded or extruded into films, tubes, and filaments which are resistant to hydrocarbons. Polyvinyl acetate is a leathery, colorless thermoplastic material which softens at relatively low temperatures and which is relatively stable to light and oxygen. These polymers are clear and noncrystalline, and the chief applications are as adhesives and binders for water-based paints.

Prior art mixtures of PVA with phosphoric acid ($H_3PO_4$) have been known to produce membranes useful for use in gas separation technology. For example, U.S. Pat. No. 4,500,667 by Polak, et al., incorporated herein by reference, describes gas permeable PVA/$H_3PO_4$ films and methods of preparing the same. The PVA/$H_3PO_4$ electrolyte of the instant invention was prepared by first making an aqueous solution of PVA at a concentration range of 1–20% PVA by weight. The optimum range was found to be 5–10% by weight. The PVA is added to water heated to a temperature of between 50° C. and 100° C., and is stirred until all the PVA is dissolved. PVA is commercially available in a wide range of molecular weights, and it has been found that PVA obtained from Aldrich Chemical in the range of 80,000–140,000 molecular weight is a preferred material. Other molecular weights in the range of 30,000–50,000 or 50,000–80,000 are also useful, and materials with even higher molecular weights may also find use. However, higher molecular weights become more difficult to dissolve and provide a lower level of hydrogen bonding between the $H_3PO_4$ and the hydroxyl group in the polymer backbone. In determining the optimum molecular weight for the polymer material, it should be noted that higher molecular weights are desirable when making an electrolyte that will be a stand-alone electrolyte, and that lower electrolyte weights of the polymer are desirable when the electrolyte is intended to be impregnated with other materials. Those skilled in the art of polymer science will realize that higher molecular weight polymers tend to be more structurally sound, whereas lower molecular weight polymers tend to be less rigid and more flexible.

In general, the amount of $H_3PO_4$ to be added to the polymer binder will vary, depending on the desired end properties of the electrolyte. For example, when the molar ratio of acid to a repeating unit of the polymer (moles of $H_3PO_4$ to $[PVA]_n$) is less than 0.25, the conductivity of the resulting electrolyte is between about $1\times10^{-8}$ and $1\times10^{-5}$ Siemens/cm. When the ratio is between 0.25 and 0.7, the conductivity of the resulting electrolyte increases to about $1\times10^{-5}$ to $1\times10^{-3}$ Siemens/cm. At ratios above 0.7, the conductivity of the electrolyte is greater than $1\times10^{-2}$ Siemens/cm, approaching that of the pure acid. Molar ratios of acid to a repeating unit of the polymer in the range of 0.1 to 2 have been found to be useful, with a value near 0.5 being preferred. Expressed another way, the acid content of the solid polymer electrolyte can be between 1% and 70% by weight. In addition, sulfuric acid ($H_2SO_4$) can also be employed to make a polymer electrolyte suitable for use in these cells, in similarly suitable ratios.

Examples of other suitable polymers include, but are not limited to, the families of polyether, polyamide, poly(acrylic acid), and polyamine. More specifically, poly(ethylene oxide), polyvinylalcohol, poly(acrylamide), poly(vinylpyrrolidone), poly(2-vinylpyridine), poly(4-vinylpyridine), and poly(ethyleneimine) may be employed as conducting polymers. In the preferred embodiment, the polymer is polyvinyl alcohol or polyvinyl acetate.

The following examples are now presented to demonstrate the use of an acid-based solid polymer electrolyte in an electrochemical cell with inorganic electrodes. The various material systems used in the examples serve to demonstrate that different types of electrochemical cells can be fabricated using various types of electrodes incorporating chemical elements, alloys, inorganic polymers and metal oxides. Also, various types of acids and polymer blends can be used as a solid electrolyte cell.

A polyvinyl alcohol (PVA) and phosphoric acid ($H_3PO_4$) solid electrolyte system was used. The electrolyte film incorporating PVA and $H_3PO_4$ was prepared in a manner similar to that reported in U.S. Pat. Nos. 4,705,545 and 4,824,528, both by Polak, et al., and both incorporated herein by reference. However, one substantial difference between the films disclosed by Polak and those of the instant invention is the amount of acid infused in the polymer matrix. Polak limits the acid ratio to no higher than 0.3, whereas we have found that even higher ratios produce the most favorable results. The PVA/$H_3PO_4$ water mixture was prepared first, and a polymer film was then made by casting the mixture on the surface of an electrode and evaporating the water. Energy storage devices were fabricated using the polymer electrolyte prepared above, and evaluated under varying conditions. An electrochemical cell was fabricated by placing the anode and cathode together in such a way that the face of the electrode that was coated with the solid electrolyte faces the opposite electrode. In the case where both the electrodes were coated with the solid electrolyte, the two electrolyte coated faces are placed in proximity. In this manner, the PVA/$H_3PO_4$ electrolyte film functions both as the electrolyte and the separator. Each of the prepared devices were measured in a potentiostat by charging and discharging over a limited voltage range and measuring the delivered current in microamps. This curve is known as a cyclic voltammogram (CV) curve.

EXAMPLE 1

Figure 2:
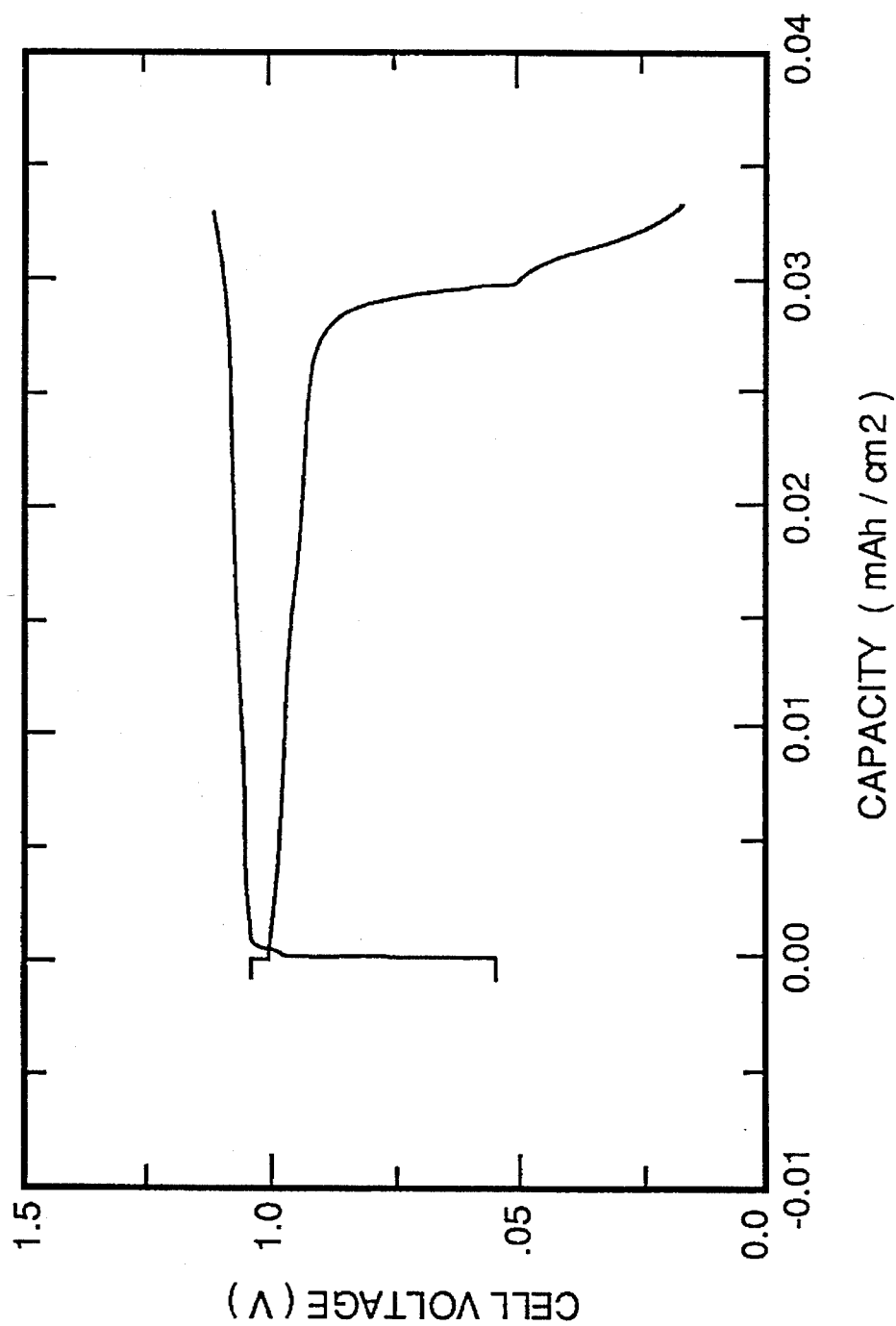
FIG. 2 is a charge/discharge curve for a cell made with a polymer/acid electrolyte, a silver electrode and a bismuth/tin electrode.
Figure 3:
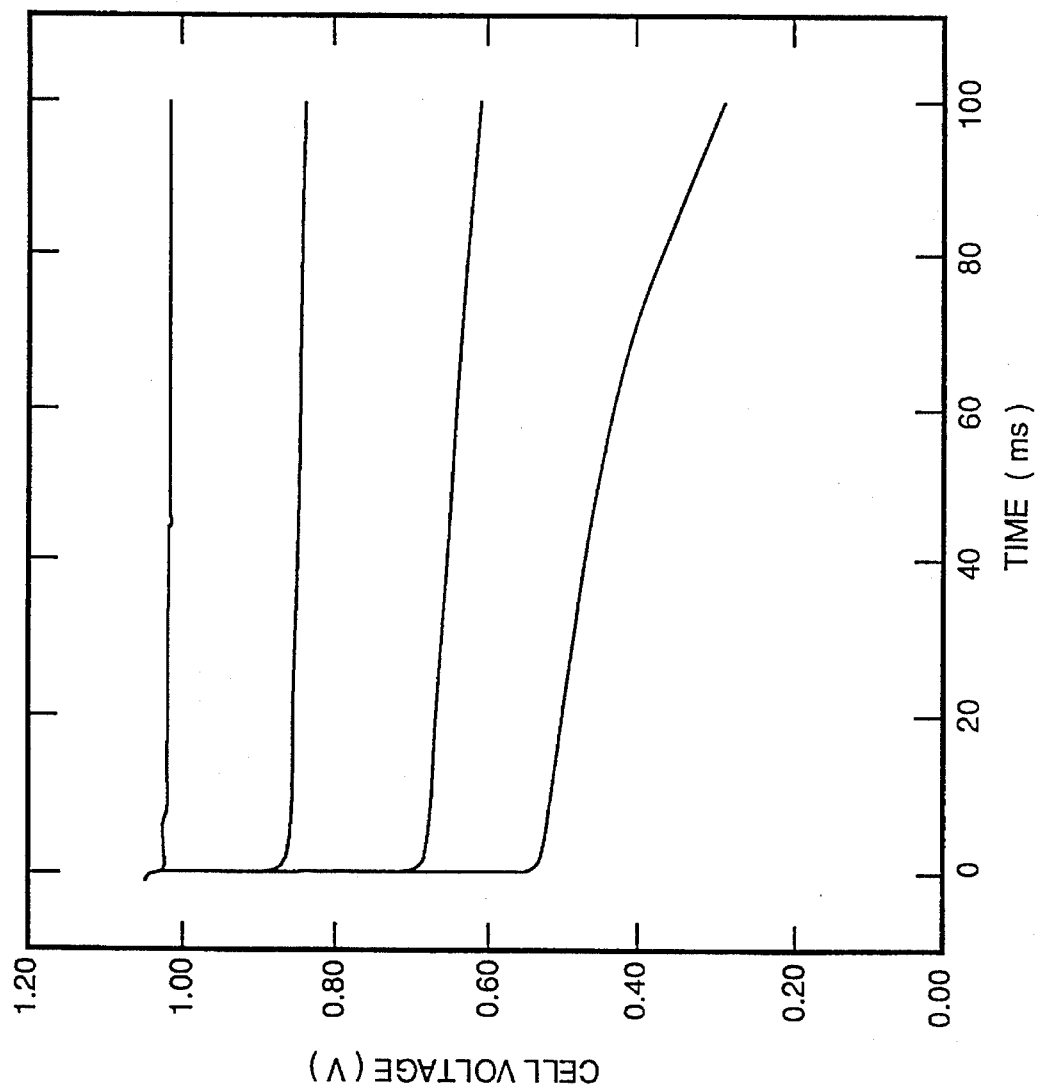
FIG. 3 is a discharge curve for the cell of FIG. 2 at varying current rates.
Figure 4:
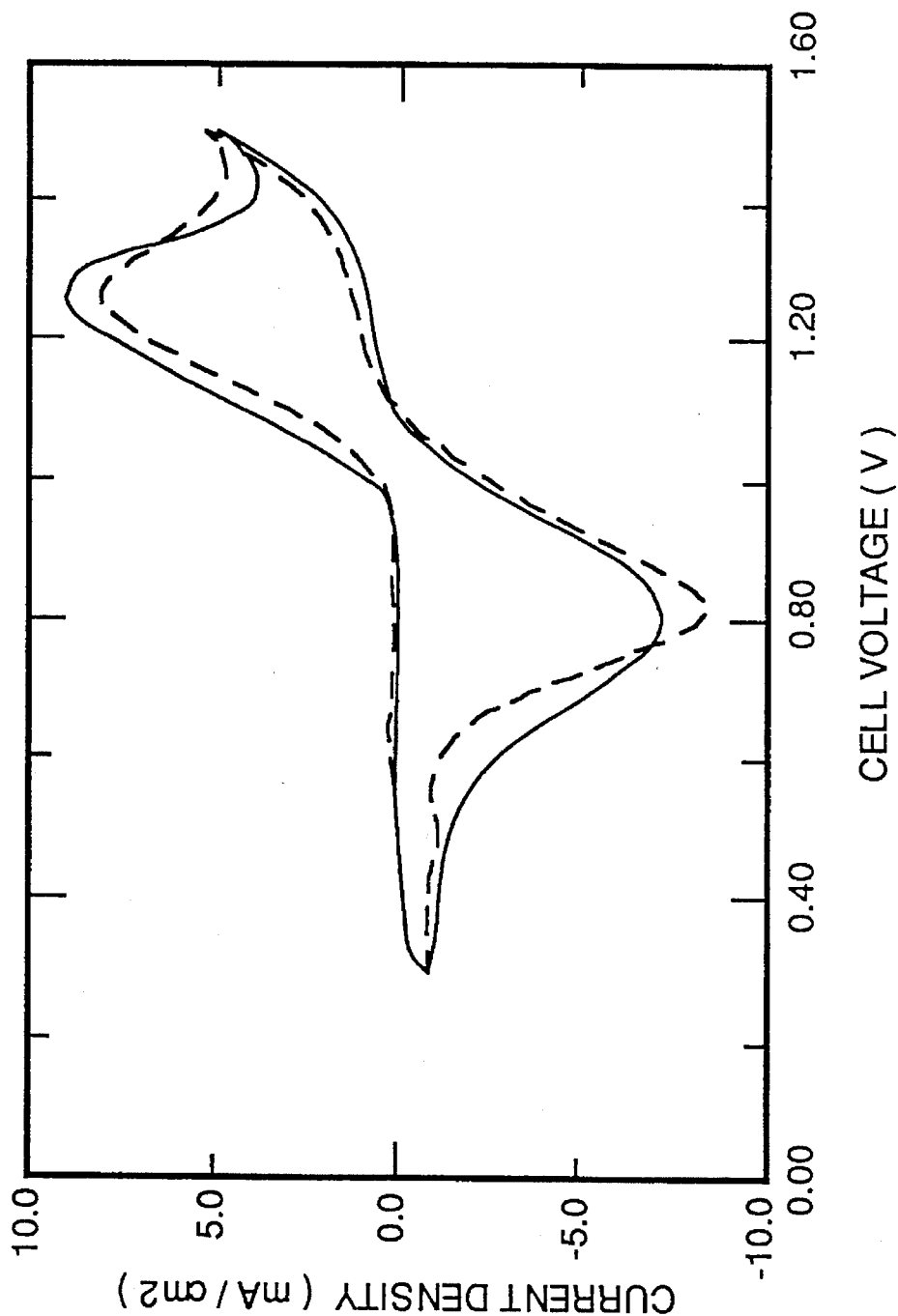
FIG. 4 is a CV curve for the cell of FIG. 2.

A silver foil, approximately 0.12 millimeters in thickness, was coated with the PVA/$H_3PO_4$ mixture and dried overnight at room temperature. The coated silver foil was then heated in air at 50°–85° C. for about three hours. After heating, the coating layer turned a dark brown color. A foil made from bismuth tin alloy (58% bismuth, 42% tin) approximately 0.05 millimeter in thickness, was electrochemically polarized in a 30% KOH aqueous solution to form an oxide layer on the surface of the film. The bismuth tin foil was then coated with the PVA/$H_3PO_4$ mixture (i.e., the electrolyte film was formed on the oxidized surface), and dried overnight at room temperature. The coated foil electrode was then heated in air at 50°–85° C. for thirty minutes. An electrochemical cell in the form of a BATCAP™ was assembled by placing the coated silver foil and the coated bismuth tin foil together with the coated surfaces facing each other. This cell, which comprised a sandwiched of the PVA/H$_3$PO$_4$ electrolyte between the two electrodes, had a thickness of approximately 0.35 millimeter and an electrode area of about 0.5 sq. centimeters. The open circuit voltage of the cell was about 1.1 volts and the resistance was about 1.4 ohm-centimeters$^2$ measured at 100 kHz. FIG. 2 shows the constant current charge/discharge curve plotted as cell voltage versus capacity (milliampere-hour/cm$^2$) at a current of 1 milliampere per square centimeter, which demonstrates the BATCAP™ behavior, i.e., a substantially flat charge/discharge curve at a 30C rate. This data indicates that energy density of the cell is about 0.3 watt-hr/kilogram. FIG. 3 shows constant current discharge curves at currents of 1, 10, 20 and 30 milliamperes/cm$^2$, which corresponds to approximately 30, 300, 600 and 900C rates respectively.. The reader should note that these current density values are much higher than prior art electrochemical cells, which usually perform at current densities less than 1 milliamperes/cm$^2$. When compared with prior art cells, provided a current density at least two orders of magnitude higher. FIG. 4 shows the cyclic voltammetry (CV) profile at a sweep rate of 20 millivolts per second for the initial cycle, as presented by the solid line, and after 200 cycles at 100% depth of discharge, as represented by the dashed line. It may be seen that after 200 cycles no significant change occurs in the cell performance.

EXAMPLE 2

Figure 5:
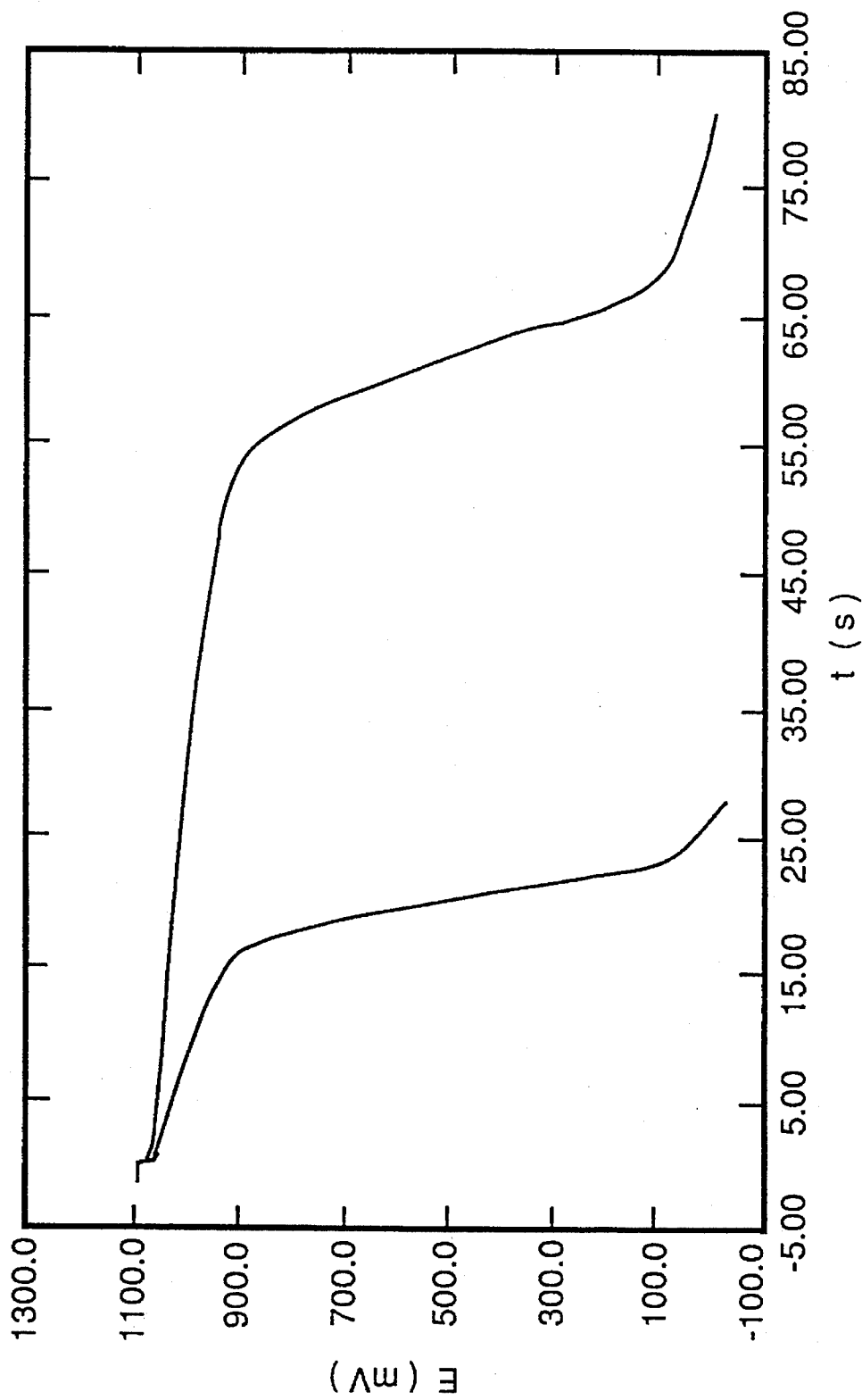
FIG. 5 is a discharge curve for a cell made with a polymer/acid electrolyte, a silver cathode and an indium anode at varying current rates.

Another cell was prepared in a manner similar to that described in Example 1, however, a foil of indium was used as the anode and the silver foil was used as a cathode. FIG. 5 shows the constant current discharge curves at I=100 and 200 microampere/cm$^2$ for this cell. The working voltage of the cell was about 1.1 volts and this curve indicates a battery type discharge curve.

EXAMPLE 3

Figure 6:
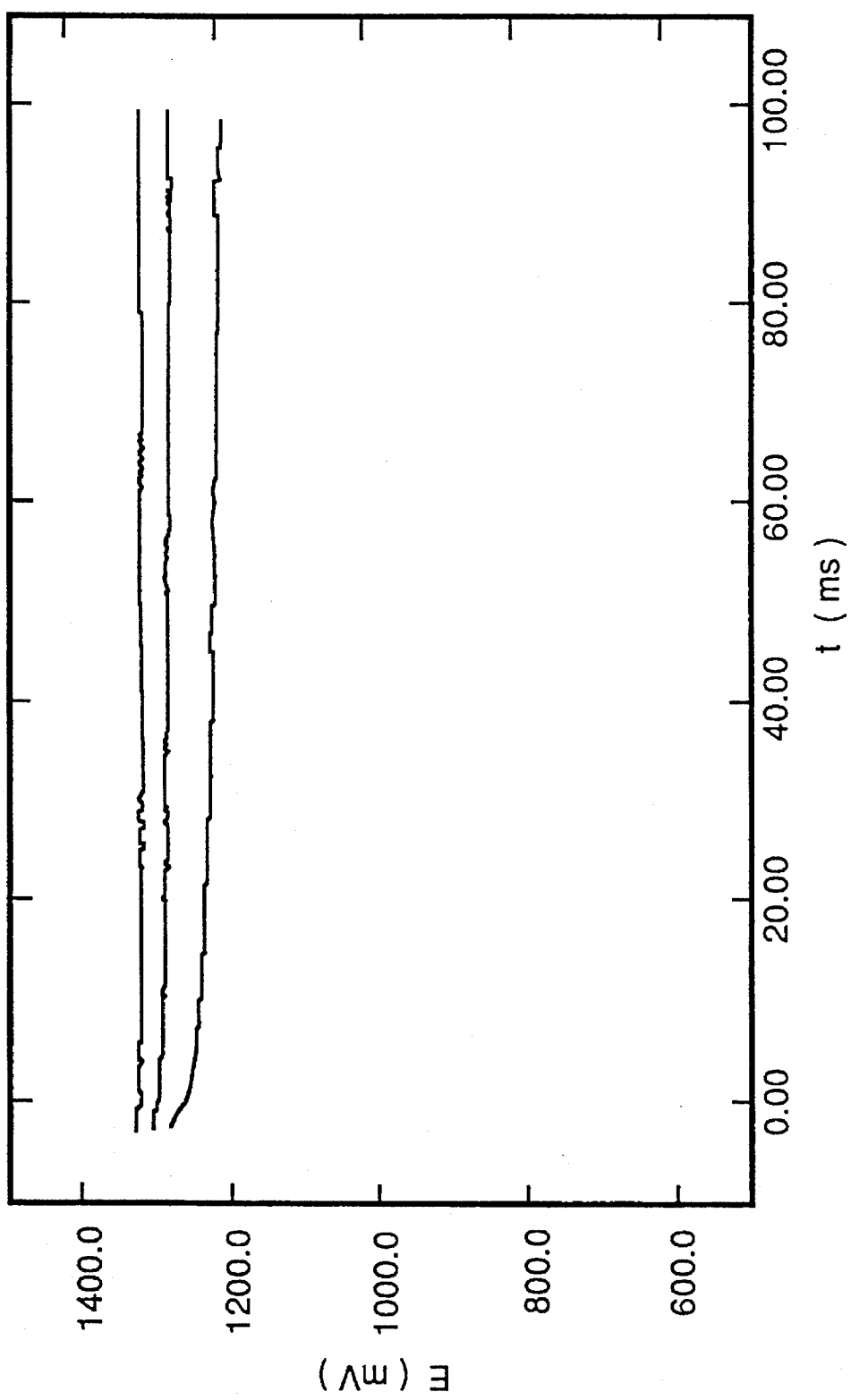
FIG. 6 is a discharge curve for a cell made with a polymer/acid electrolyte, a silver cathode and a zinc anode at varying current rates.

An electrochemical cell was prepared in a manner similar to that explained in Example 1, however, zinc foil was used as the anode material with silver foil as the cathode. FIG. 6 shows the constant current discharge curves at a current of 0.2, 0.4 and 1.0 milliamperes/cm$^2$. The working voltage of the cell was about 1.3 volts and the shape of the curve indicates a performance similar to that of a battery.

EXAMPLE 4

Figure 7:
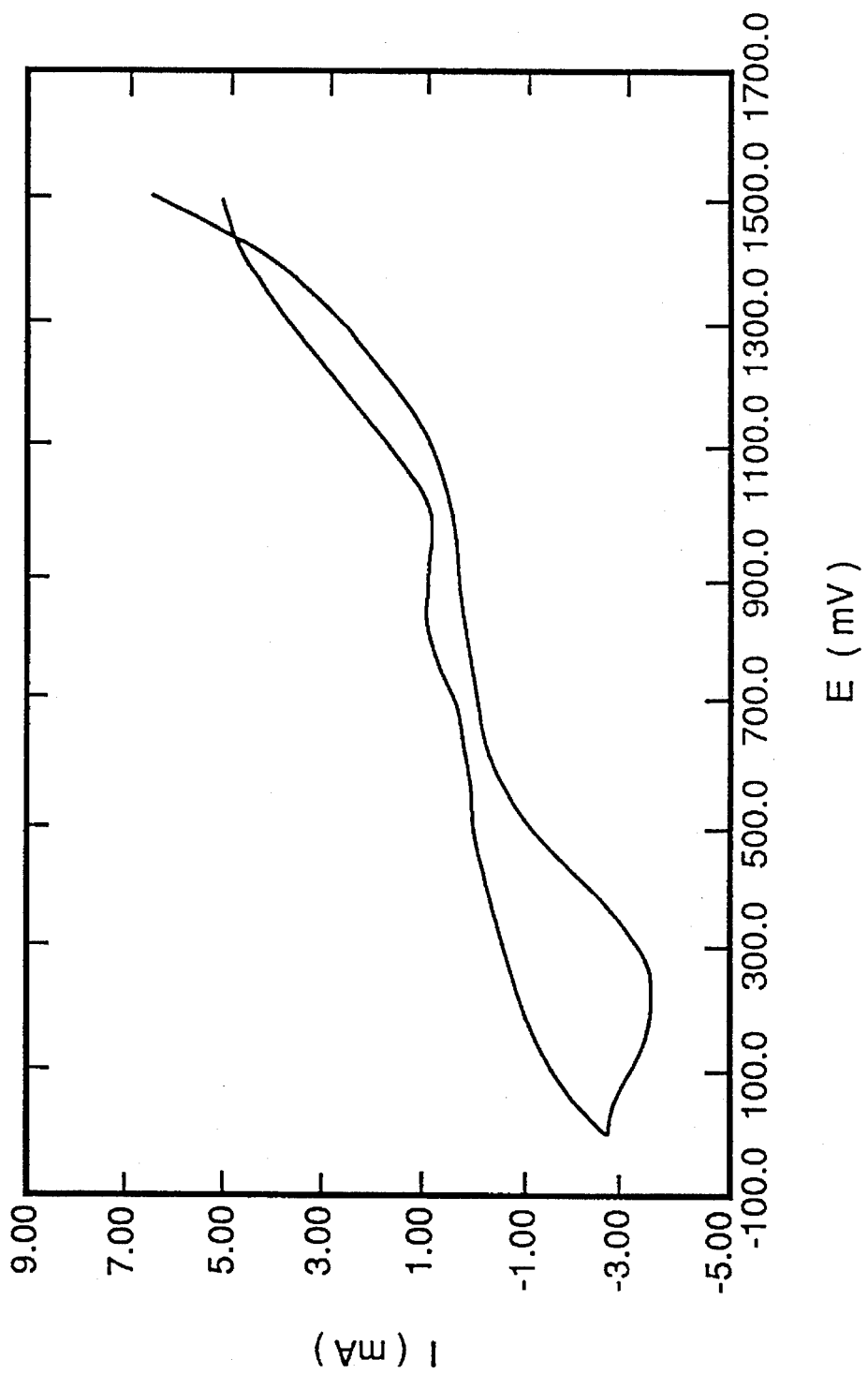
FIG. 7 is a CV curve for a cell made with a polymer/acid electrolyte, a silver cathode and a antimony/bismuth anode.

An electrochemical cell was prepared in a manner similar to that explained in Example 1, however, a foil made from an antimony bismuth alloy was used as the anode with the silver foil as the cathode. FIG. 7 shows a CV profile at 10 millivolts per second. The energy storage capacity of this cell was about 390 millicoloumbs/cm$^2$ (0.108 milliampere-hours/cm$^2$), and the cell voltage was about 0.65 volts.

EXAMPLE 5

Figure 8:
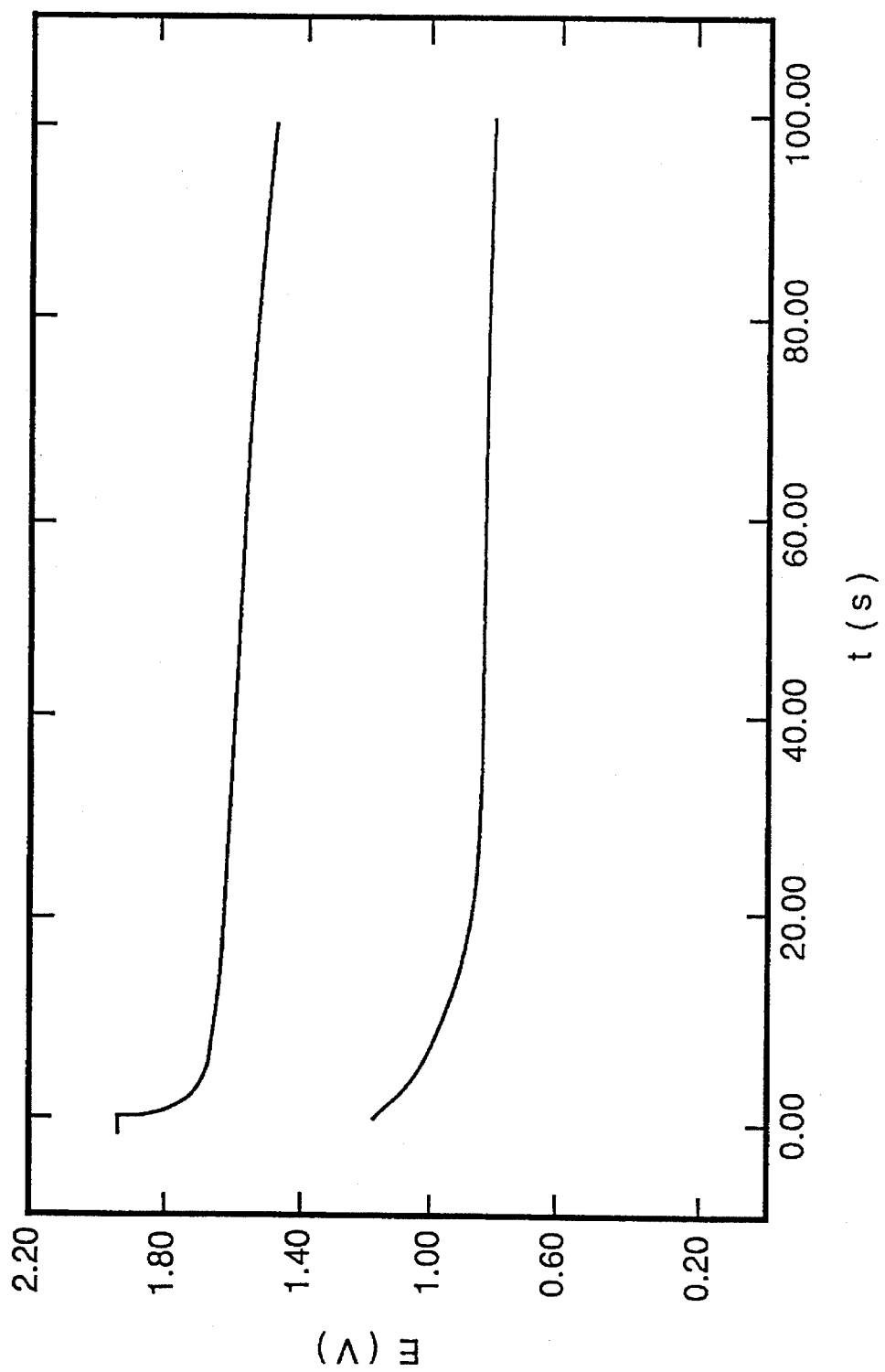
FIG. 8 is a discharge curve for a cell made with a polymer/acid electrolyte, a graphite cathode and a bismuth/tin anode.

An electrochemical cell was prepared in a manner similar to that explained in Example 1, however, a foil made from a bismuth tin alloy was used as the anode and a sheet of graphite coated with isopolymolybdate was used as the cathode material. The isopolymolybdate was coated on the graphite sheet and dried to form a polymer film. The two electrodes were assembled in a sandwich with the solid-state electrolyte separating the anode and the cathode and the cell was tested. FIG. 8 shows the constant current discharge curves at I=100 microampere/cm$^2$ for a single cell and for a stacked double cell. The shape of the discharge curve indicates a battery type performance and the working voltage was about 0.85 volts for the single cell and 1.7 volts for the two cell.

EXAMPLE 6

Figure 9:
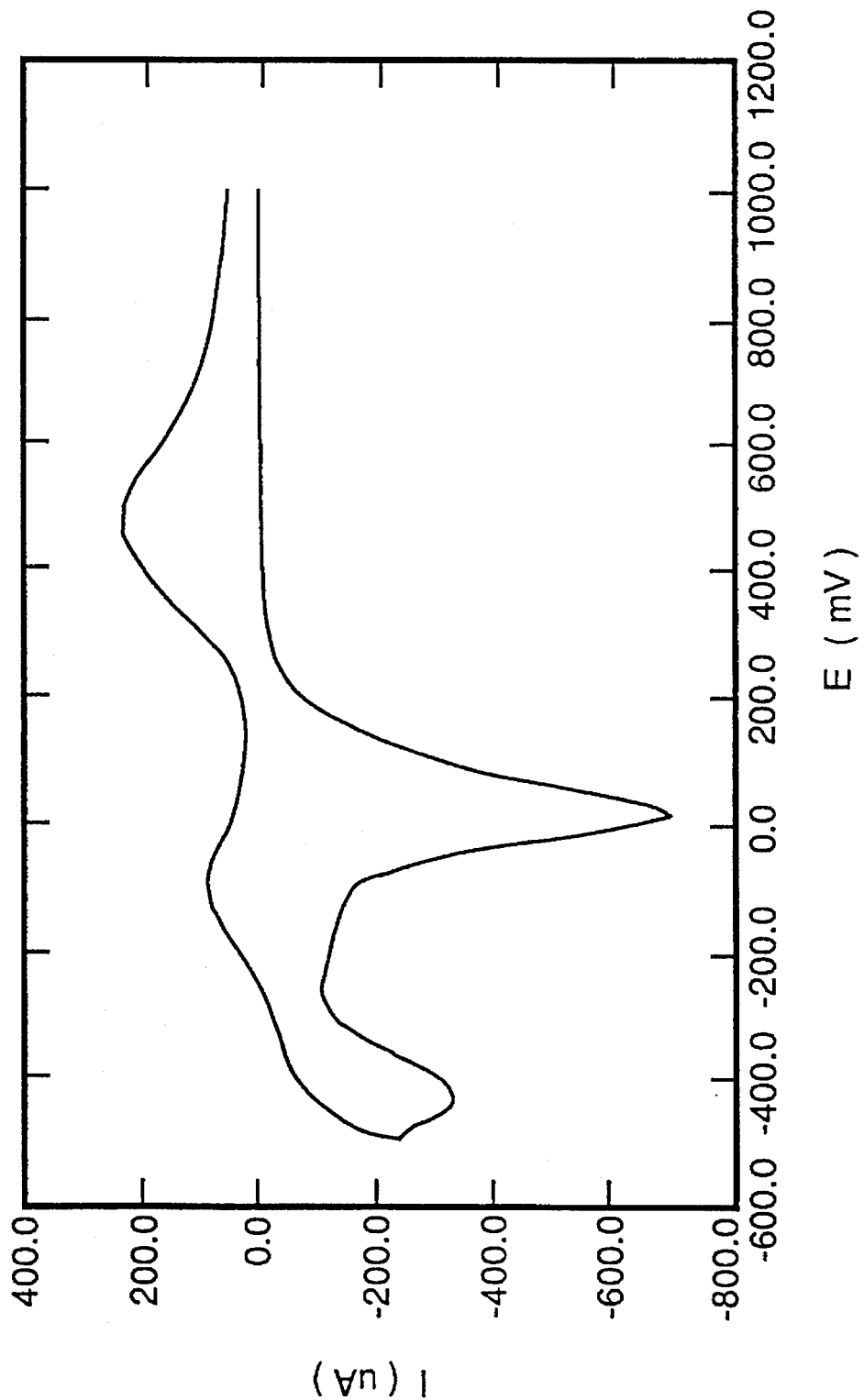
FIG. 9 is a CV curve for a cell made with a PVA/sulfuric acid electrolyte, a nickel/molybdenum/chrome cathode and a antimony/bismuth anode.

The cell prepared for this example used PVA and H$_3$PO$_4$ as the solid electrolyte which was coated on a foil of an antimony bismuth alloy used for the anode. The cathode was a foil of a nickle-molybdenumchrome alloy (known as HASTEALLOY C22™). The cell sandwich formed in this manner was tested and the results shown in FIG. 9, which is a CV profile performed at 20 millivolts per second. The open cell voltage was about 0.4 volts.

The results obtained using the examples illustrated above indicate that these and other materials may be useful as electrodes in a cell using an acidic solid polymer electrolyte system. Materials useful as anode materials include tin, zinc, magnesium, aluminum, manganese, bismuth, antimony, lead, iron, tungstens, and their alloys. Materials useful as cathodes includes silver, nickle, molybdenum, magnesium, lead, chrome, cobalt, copper, gold, iron, tungsten, vanadium, and their alloys. In general, the inorganic materials described in these electrochemical cells have the following electrochemical redox reactions:

$$MO_2 + H^+ e + \Longleftrightarrow MOOH \qquad (1)$$

or

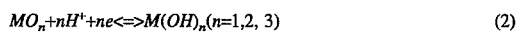

$$MO_n + nH^+ + ne \Longleftrightarrow M(OH)_n (n=1,2,3) \qquad (2)$$

or

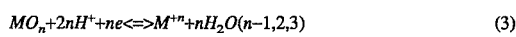

$$MO_n + 2nH^+ + ne \Longleftrightarrow M^{+n} + nH_2O (n=1,2,3) \qquad (3)$$

where 'M' represents the metals enumerated above, and 'e' represents and electron. The above reactions 1 and 2 may be referred as "proton intercalation" which is analogous to the well known "lithium intercalation" reactions found in lithium battery systems.

In summary, a solid-state approach to the construction of electrochemical cells such as electrochemical capacitors, batteries, or BATCAP™s, has been demonstrated and offers a number of highly desirable features. These include: 1) ease of fabrication, 2) rugged construction, 3) no liquids to leak out of the system, 4) improved safety, and 5) small, very thin single or multiple cells. This type of system clearly overcomes problems with cells which utilized liquid electrodes as known in the prior art, which are prone to electrolyte leakage and damage as well as causing a safety and environmental hazard. The cells of the instant invention, having asymmetric electrodes and a thin solid-state electrolyte are significantly smaller than those of the prior art, and thus may be used to provide ultra-thin batteries, and the cells of the instant invention have been demonstrated to be useful in making multi-cell formats. This type of construction provides for improved packaging, thereby reducing the bulk of the finished-package and increasing the energy density. These cells also provide the ability for a very fast charge/discharge cycle. Thus, a solid-state electrochemical cell using metals or metal oxides as electrode materials in an asymmetric construction and using a proton-conducting polymer such as PVA and $H_3PO_4$ has been demonstrated.

While the preferred embodiments of the invention have been illustrated and described, it will be clear that the invention is not so limited. Numerous modifications, changes, variations, substitutions and equivalents will occur to those skilled in the art without departing from the spirit and scope of the present invention as defined by the appended claims.

What is claimed is:

1. An electrochemical capacitor device comprising:
   an anode from the group consisting of zinc, zinc oxides, zinc hydroxides, zinc alloys, and combinations thereof;
   a cathode from the group consisting of manganese, manganese oxide, manganese alloys, and combinations thereof; and
   a solid polymer electrolyte with and disposed between said anode and said cathode, said solid polymer electrolyte comprising a binder of one or more polymers selected from the group consisting of polyethylene oxide, polyvinyl(alcohol), polyvinyl acetate, polyacrylamide, poly(vinylpyrrolidone), poly-(2-vinylpyridine), poly(4-vinylpyridine), and polyethyleneimine, and having dispersed therein $H_2SO_4$ or $H_3PO_4$.

2. The electrochemical capacitor as described in claim 1, wherein the solid polymer electrolyte has a molar ratio of $H_2SO_4$ or $H_3PO_4$ to a repeating unit in the polymer, said molar ratio being between 0.1 and 2.

3. The electrochemical capacitor as described in claim 1, wherein the solid polymer electrolyte comprises about 30% to about 99% by weight binder, and about 1% to about 70% by weight $H_2SO_4$ or $H_3PO_4$.

4. An electrochemical capacitor device comprising:
   a first electrode fabricated from a nickel-molybdenum-chromium alloy;
   a second electrode fabricated of a bismuth-tin alloy, and
   a solid polymer electrolyte with and disposed between said anode and said cathode, said solid polymer electrolyte comprising a binder of one or more polymers selected from the group consisting of polyethylene oxide, polyvinyl(alcohol), polyvinyl acetate, polyacrylamide, poly(vinylpyrrolidone), poly-(2-vinylpyridine), poly(4-vinylpyridine), and polyethyleneimine, and having dispersed therein $H_2SO_4$ or $H_3PO_4$.

* * * * *